United States Patent [19]

Nixon

[11] Patent Number: 5,090,430

[45] Date of Patent: Feb. 25, 1992

[54] ULTRASONIC CLEANING SYSTEM FOR FLUORESCENT LIGHT DIFFUSER LENS

[75] Inventor: Kent A. Nixon, Springfield, Pa.

[73] Assignee: Agape Enterprises, Inc., Springfield, Pa.

[21] Appl. No.: 473,909

[22] Filed: Feb. 2, 1990

[51] Int. Cl.$^5$ .............................. B08B 3/12
[52] U.S. Cl. ................... 134/84; 134/102; 134/184; 134/1; 134/34
[58] Field of Search ............ 68/355; 134/84, 184, 134/102, 200, 61, 76, 64 R, 186, 1, 34

[56] References Cited

U.S. PATENT DOCUMENTS

| | | | |
|---|---|---|---|
| 847,129 | 3/1907 | Sunkle | 134/76 |
| 959,562 | 5/1910 | Larson | 134/76 |
| 2,480,931 | 9/1949 | Jaeger | 134/200 X |
| 3,001,769 | 9/1961 | Plassmeyer | 68/355 X |
| 3,084,020 | 4/1963 | Loosli | 68/355 |
| 3,098,250 | 7/1963 | Creech | 134/64 R |
| 3,178,745 | 4/1965 | Kleebauer | 134/180 |
| 3,406,697 | 10/1968 | Mitchell et al. | 134/902 X |
| 3,527,607 | 9/1970 | Antoneveich | 134/184 X |
| 4,051,858 | 10/1977 | Mele | 134/200 |
| 4,193,842 | 3/1980 | Rushing | 162/199 |
| 4,344,448 | 8/1982 | Potts | 134/73 |
| 4,483,571 | 11/1984 | Mishiro | 310/323 |
| 4,605,027 | 8/1986 | Dallot | 134/108 |
| 4,691,724 | 9/1987 | Garcia et al. | 134/169 |
| 4,705,054 | 11/1987 | Fields | 134/57 |
| 4,727,734 | 3/1988 | Kanazawa et al. | 68/355 |
| 4,727,896 | 3/1988 | Kanazawa et al. | 134/184 |
| 4,763,677 | 8/1988 | Miller | 134/105 |
| 4,788,992 | 12/1988 | Swainbank et al. | 134/64 |
| 4,881,561 | 11/1989 | Schwarzwalder | 134/184 X |

FOREIGN PATENT DOCUMENTS 611057578 11/1983 Japan.

OTHER PUBLICATIONS

Crest Ultrasonics' Genesis Series G Product Bulletin.
Crest Ultrasonics' Instruction Manual IM-3310, Original 4/86, Revised 12/86.

Primary Examiner—Frankie L. Stinson
Attorney, Agent, or Firm—Elman & Wilf

[57] ABSTRACT

A method and apparatus for on-site removal, efficient cleaning, and expeditious restoration to service of the diffuser lenses, i.e. diffusers, lenses, and reflectors, used in fluorescent lighting fixtures. The apparatus employs dual immersion chambers, deep troughs, filled with a liquid medium suited to ultrasonic transducer agitation. It comprises a rectangular cabinet, having longitudinal slots in the top that provide external access to the troughs. The narrower trough, with appropriate liquid contents, serves as the initial scrubbing or washing chamber, while the wider trough, with differing liquid contents, serves as a rinsing and article-recoating trough. An ultrasonic transducer is horizontally disposed within a niche in one of the walls of the wash trough. Diffuser lenses are cleaned by detaching them from their fixtures, placing them one at a time into the washing trough, where they are cleaned by ultrasonic liquid agitation, and then into the rinsing trough. After removal from the rinsing trough, they are dried, preferably by suction extraction, and replaced in their fixtures.

23 Claims, 8 Drawing Sheets

ULTRASONIC CLEANING SYSTEM FOR FLUORESCENT LIGHT DIFFUSER LENS

BACKGROUND OF THE INVENTION

1. Field of Invention

This invention relates to improvements in methods and means for the topical cleaning of convoluted surfaces of planar articles, and more particularly to an ultrasonic method and means for cleaning complex articles, especially lenses, diffusers and reflectors for fluorescent light fixtures.

2. State of the Art

In modern office buildings, fluorescent tube lighting is employed for energy economy and tube longevity as well as its generally superior efficiency as compared to incandescent lighting. Various configurations of light diffusers, usually composed of plastic or coated sheet metal, are used to shield the worker from directly seeing the fluorescent tube(s) in the ceiling fixture and also to make the overhead appearance more aesthetic, as well as functional. Such lenses and diffusers are often transparent or translucent sheets formed from durable plastic materials. They may be assembled from fabricated struts and cross-members, sometimes arranged in the manner of the dividers seen in egg crates to isolate the fragile eggs. In addition, reflectors of plastic coated with a thin metallic film, are often fabricated in the shape of multiple parabolas. Unless the context implies something more specific, the term "diffuser lens" is used herein to refer to the entire range of structures that provide for the redirection of light from fluorescent ceiling fixtures, including also the structures commonly known as lenses and as reflectors.

The convoluted surfaces of diffusers predictably catch and retain dust, and soil, as well as particles and tars resulting from tobacco smoking. This result is augmented when ceiling fixtures also have integral louvers or flow channels for drawing air from the working area for filtration and/or temperature and humidity adjustment.

It is part of a good office maintenance routine to remove the diffusers or lenses for periodic cleaning of the unsightly coatings that are being steadily deposited so quickly. To manually scour and scrub these soil-coated lenses is quite laborious, since their surface design has evolved from planar to prismatic, and even to parabolic, rendering time-tested manual scrubbing methods obsolete and economically impractical.

Methods for using ultrasonic transducers to clean solid articles are known, such as are described in U.S. Pat. No. 4,705,054, entitled "Ultrasonic Radiator Cleaning", issued Nov. 10, 1987. Similarly, an apparatus for cleaning a linear object such as an uncoated flexible continuous strip is taught in U.S. Pat. No. 4,605,027 to M. Dallot. Neither of the reference devices is suited, or could be adapted, to treatment of the complex-surfaced light diffusers addressed by the present invention.

SUMMARY OF THE INVENTION

It is a principal object of the present invention to provide means for adapting ultrasonic energy to liquid-medium cleaning of intricately structured articles of manufacture, such as diffusers employed in fluorescent ceiling fixtures. Another object is to provide means for cleaning diffusers in a tailored fluid medium utilizing a portable source of ultrasonic energy.

An advantage of the present invention is that a relatively lightweight and compact mobile ultrasonic cleaning apparatus is provided, which can be moved to areas of substantial fluorescent lighting fixtures to readily service the soiled diffusers on site, thus minimizing lighting down time and avoiding wasted effort in transporting such diffusers to central cleaning stations.

The accomplishment of these objects, as well as other aspects or features of the invention will be apparent to one skilled in the art from the remainder of the specification, as well as the claims and drawings appended hereto.

The present invention provides a novel method and apparatus for on-site removal, efficient cleaning, and expeditious restoration to service of the diffuser lenses (i.e., lenses, diffusers and reflectors) used in fluorescent ceiling fixtures. The present apparatus was developed and adapted to handle virtually all types of diffuser lenses found in the commercial, industrial and institutional environments, including lenses, the translucent diffusers known as "egg crates," and parabolic reflectors. Typically a diffuser lens may include a metal frame in which the light-diffusing or reflecting member is mounted permanently for support, the frame generally including means for detaching from and reattaching to the permanently mounted ceiling fixture.

Ultrasonic cleaning via the present method involves removal of stubborn soils and contaminants that have deposited on manually inaccessible and complex lens surfaces, by employing the ultrasonic cleaning phenomenon of liquid cavitation. Ultrasound serves to agitate the liquid medium, yielding microscopic-sized voids, or bubbles in the medium, which implode under pressure or upon contact with the workpiece. Such scrubbing action of the cavitation cycle results in effective ultrasonic cleaning.

The foregoing advantages are provided by an apparatus employing dual immersion chambers, or deep troughs, filled with a liquid medium suited to agitation by an ultrasonic transducer—to effect suspension of soil particles during the cavitation phase, and without any appreciable volatilization of the medium. The device comprises a rectangular outer container of size and durability suited to placing in the confined space of passenger elevators. The outer container has imperforate side, end and bottom walls, and a detachable cover, fitting snugly over the upper edges of the sidewalls. The planar cover is provided with at least two longitudinal slot-like openings, their axes being coincident with the longitudinal axis of the container. These openings provide the external access to inner, and necessarily smaller, rectangular chambers or troughs, also having imperforate end, side and bottom walls, with the overlying opening having a depending skirt that effects sealing contact with the upper periphery of the inner trough sidewalls. The narrower trough, with appropriate liquid contents, serves as the initial scrubbing or washing chamber, while the wider trough, with different liquid contents, serves as a rinsing and article-recoating trough.

Preferably, an inlet means and an opposing end wall outlet means, both connected to the lower portion of the wash trough, are provided for circulating, and replenishing as needed, the cleaning medium. Alternatively they function for removing contaminated medium and accumulated soil particles from the sump portion of the operating chamber. Primarily, however, each of the troughs is filled from the top, as by a hose connected to the faucet of a janitorial sink. When the time comes to empty the troughs, either because the liquid therein has become too dirty for further use and must be replenished or because the washing project is completed, a hose is connected to draining means in the apparatus and led to a toilet or sink drain as available.

Along the upper portion of one of the first inner trough side walls, there is provided a horizontally-aligned, elongated niche of such dimensions that it is adapted to receive an ultrasonic transducer device, associated with a remote ultrasonic generator module. This will provide all of the mechanical (kinetic) energy to the one reservoir medium, which is needed to effect complete cleaning of an immersed article workpiece. The niche in which the transducer module is mounted must be disposed below the surface of the wash medium; and the transducer is in integral contact with the fluid in the trough along one of its lateral sidewalls. The ultrasonic transducer is fixedly mounted axially within the longitudinal niche and should be of sufficient operational length to completely overlap the longer dimension of the immersed lens.

Virtually all of such diffuser lenses are elongate planar articles. The internal dimensions of the first inner trough are such that the largest of the commercially-used light diffuser lenses could be readily lowered by hand into the trough, and further, that the articles will be completely immersed during the agitated cleaning. The transverse dimension of the chamber must be sized to maximize substantial ultrasonic energy agitating the liquid moving onto the complex surfaces of the immersed article being cleaned.

Operatively associated with the wash trough is a parallel and substantially larger rinsing-function trough, of comparable length and depth to the first trough, but of a greater width, so that one or more washed diffuser lenses can be loaded therein. Its depth is such that substantially all of the planar article can be immersed in the rinsing solution. It is located close to the wash trough so that the relatively unwieldy planar articles to be cleaned can be readily removed from the wash trough by hand, moved only a short distance transversely, and then immersed in the rinse trough, thereby effecting speed of operation and minimizing potentially warping forces on the articles.

The aqueous rinse solution preferably provides a silicone-based material that deposits on the article as it is rinsed and provides an anti-static coating, before the fully cleansed article is lifted for physical separation (preferably by suctioning) of any aqueous medium remaining on the article surface.

DETAILED DESCRIPTION OF THE PREFERRED EMBODIMENT OF THE INVENTION

Although specific terms are used in the following description for the sake of clarity, these terms are intended to refer only to the particular structure of the invention selected for illustration in the drawing, and are not intended to define or limit the scope of the invention.

Figure 1:
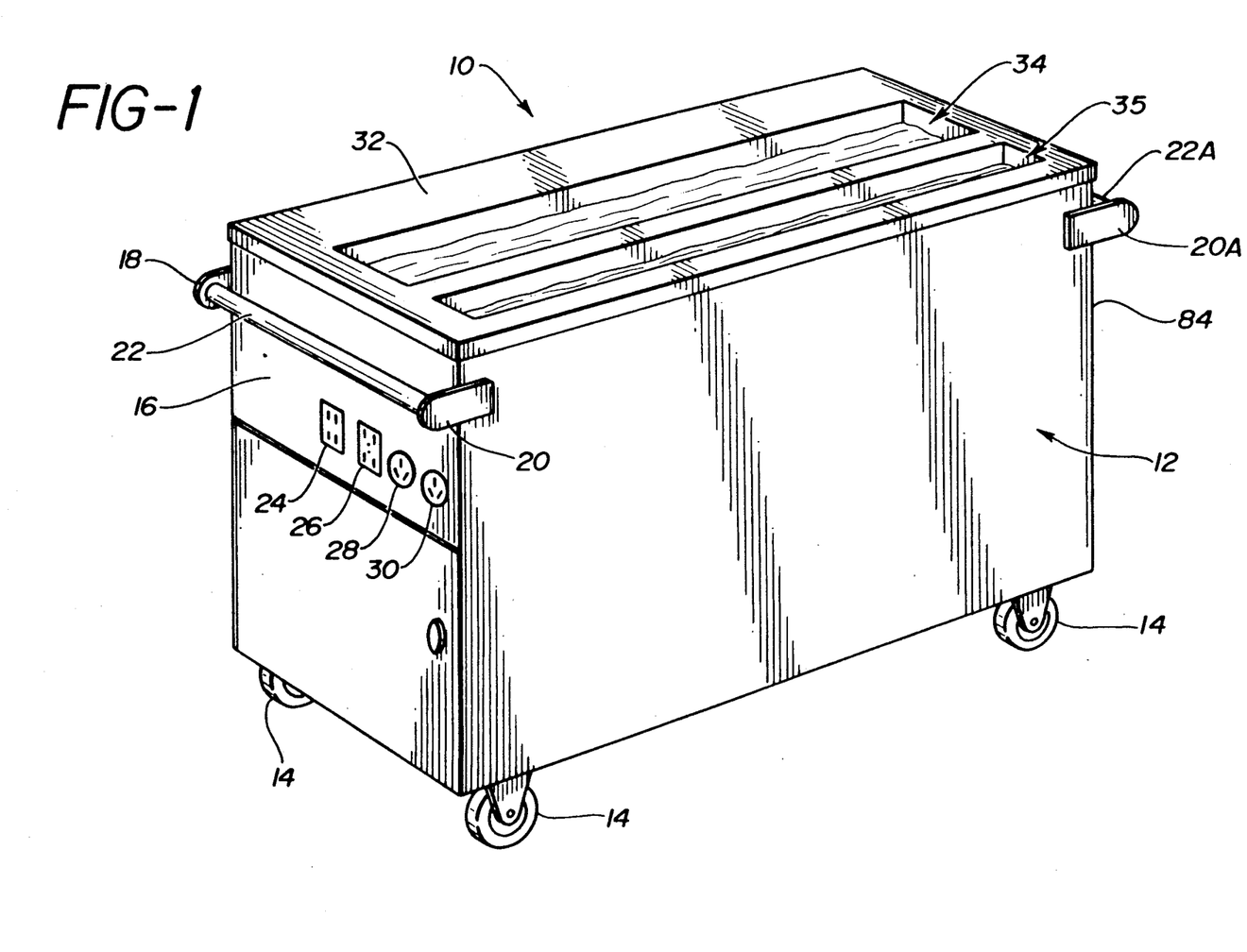
FIG. 1 is a perspective view, generally endwise, illustrating the mobile ultrasonic console cleaning system of the present invention.

Attention is now directed to the drawings, and particularly to FIG. 1, showing the mobile ultrasonic cleaning apparatus 10 of the invention. This includes a double-wall container 12, or housing, supported on conventional casters 14 (swiveling wheels) at each corner. Projecting fixedly from the lateral edges of proximal end wall 16 are matching support plates 18, 20, between which is disposed a horizontal gripping bar 22. A complemental pair of support plates and grip bar are provided on the other longitudinal end.

Loaded below bar 22 are side-by-side female sockets 28, 30, adapted to receive one or more power plugs (not seen), for providing electrical current to power an optional medium-heating component, the circulating pump, and the ultrasonic generator (not seen). Adjacent the sockets are a duplex ground fault circuit interrupter (GFCI) receptacle 24 and GFCI motor switch 26. Disposed on planar cover 32 of the apparatus 10, are side-by-side (parallel), longitudinally-aligned, slot-like large openings, 34 and 35. These slots provide access to the internally-located, parallel wash and rinse cleaning troughs (not seen).

Figure 2:
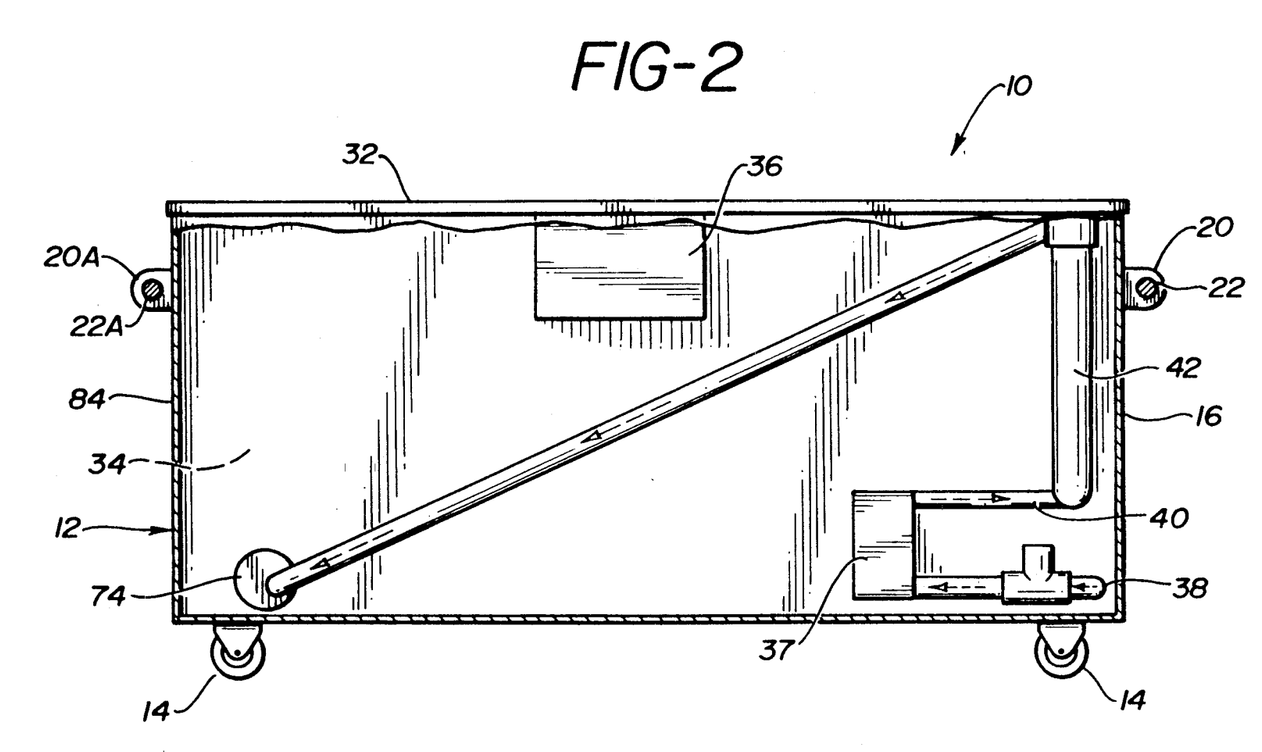
FIG. 2 is a side elevational view of the mobile apparatus of FIG. 1, substantially broken out, showing certain internal accessory elements of the invention.

Referring now to FIG. 2, the elongate configuration of apparatus 10 is better seen, along with the matching bar support plates 20, 20A and push bars 22, 22A, located at the distal end of the device.

The broken out, one-side view of FIG. 2 depicts certain of the accessory components which are associated with the cleaning troughs. Suspended fixedly under the console cover 32 is an off-the-shelf ultrasonic wave generator 36, which is electrically connected to an associated ultrasonic transducer (not seen). Also disposed on this side of the troughs is a circulating pump 37, and associated flow conduits 38 and 40, which are operatively connected to the wash trough only (not seen). Disposed within the wash solution return conduit 40 is a barrel-type filter 42 for removal of entrained debris and heavy soil particles. Disposed behind these accessories is the rectangular side wall of rinse trough 34.

Figure 3:
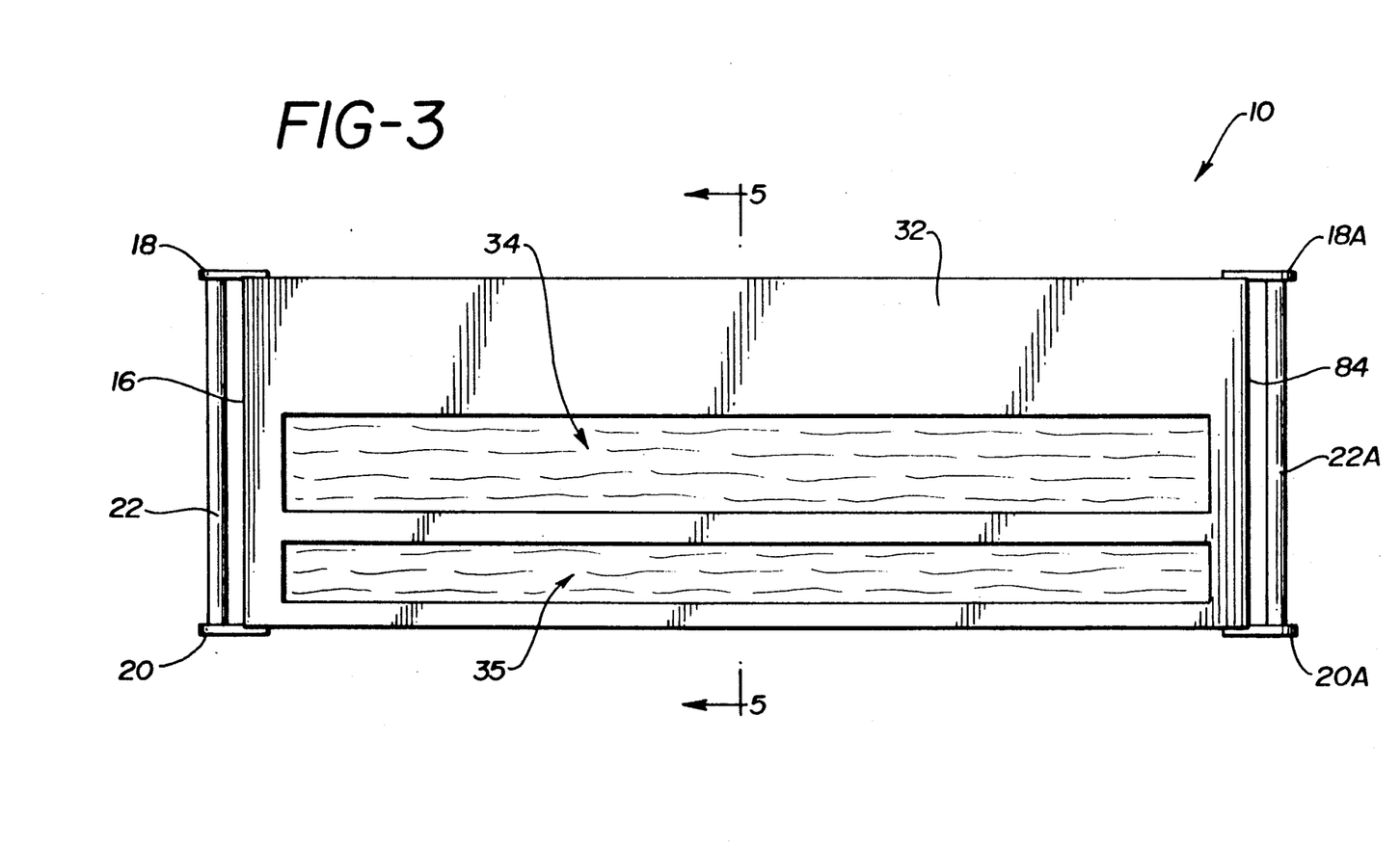
FIG. 3 is a top plan view of the apparatus of FIG. 1.

In the top plan view of FIG. 3, there will be seen the two article-receiving, slot-like openings at the respective tops of troughs 34 and 35. While both are of substantially like length, they are of different widths (and depths), as will be detailed. Other than the offset push bars 22 on each longitudinal end, no other elements project outside the sides and top surface 32 of console 10, thereby enhancing the ability of the apparatus to be moved about through tight spaces, such as might exist in old buildings.

Figure 4:
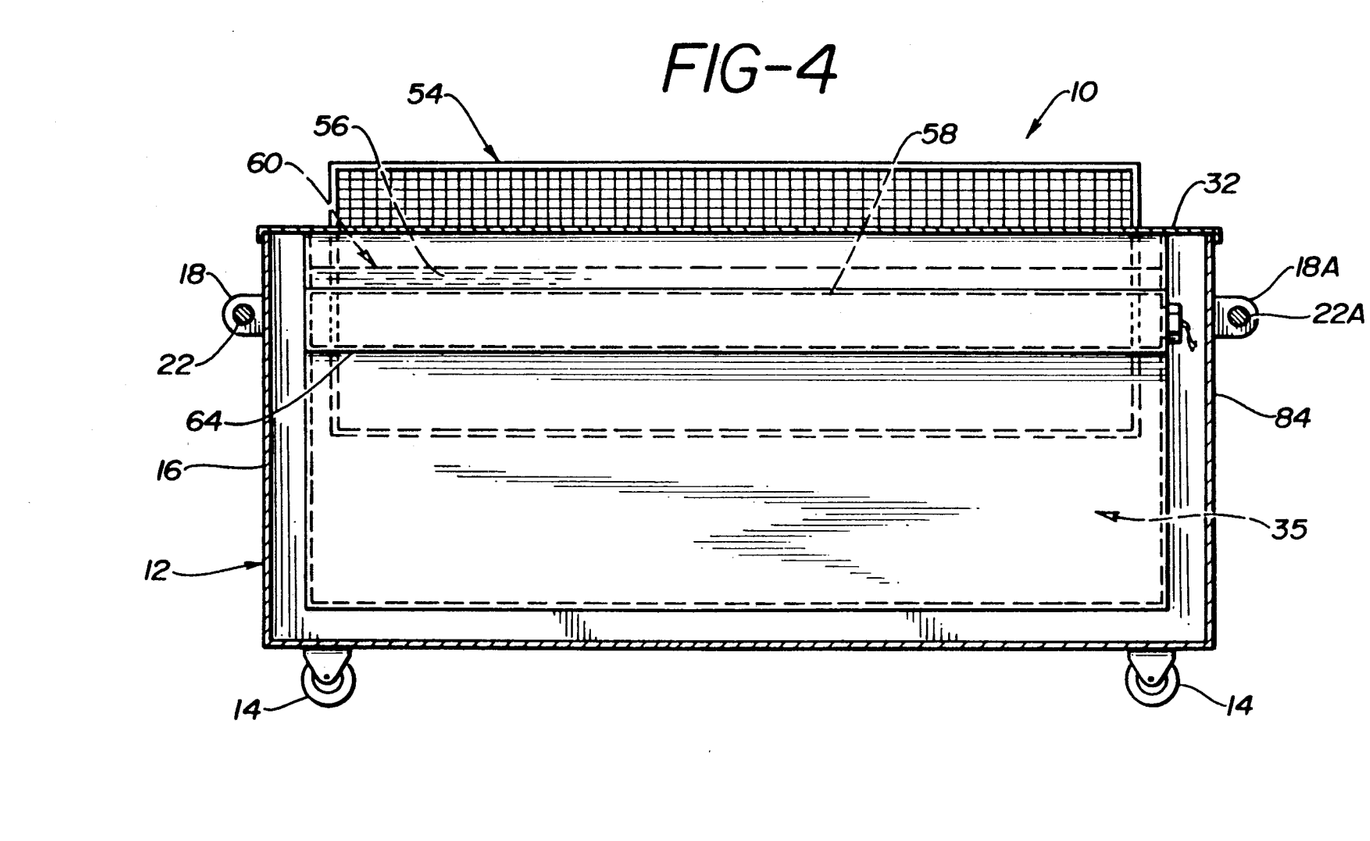
FIG. 4 is another side elevational view, substantially broken out, to show the transducer module (internal) operating configuration and the main wash chamber of the invention.

In the alternate side view of FIG. 4, partially broken out, the rectangular diffuser lens workpiece 54 is depicted as already partly lowered into the cleaning medium, the wash solution 56. Diffuser lens 54 should be fully immersed during the period of transducer operation, to insure that all of its surfaces are reachable by the activated wash solution 56. Note that the single elongated ultrasonic transducer unit 58 is positioned clearly below the liquid operating level 60. As the workpiece 54 is moved in and then out of the bath, transducer 58 will impose its energy via wash solution 56, transversely across the moving diffuser.

The transducer is of sufficient length so as to provide a complete scrubbing effect which is substantially uniform over the longitudinal dimension of the diffusion panel 54.

The transducer means 58 should be an immersible model, as will be detailed, and electrically protected by a GFIC. A suitable transducer device has an effective radiating surface which measures about 4 inches high by 48 inches long. The transducer units of the present invention are mounted within a niche (FIG. 5), preferably bolted therein so as to maximize the transduced energy being taken up by the trough sidewalls, which incidentally leaves the surface of the liquid medium essentially unagitated. Rather, almost all of the electrical input is transduced to provide a fluid kinetic force applied to the submerged article. The preferred ultrasonic device employs state-of-the-art, transistorized features which make for maximum output and automatically compensate for voltage fluctuations, solution density variation or workpiece loading.

A suitable component is the Vibrabar transducer which has an exposed, stainless steel surface or face plate 53, which is a radiant surface of about 4" high and about 48" long. This length is essentially comparable to the longitudinal width of a soiled diffuser, being marginally larger. As such it overlaps the entire diffuser lens length when it the diffuser lens is moved across the transducer action surface. (A diffuser lens typically has a transverse dimension of about 23 inches.) The transducer face plate 53 is the operative part of a hermetically-sealed rectangular container (of approximately 4×3 inch cross-section), in which a plurality of "horns" are operatively fixed to the obverse side of the resonating plate. Their number and power rating for this application is within the skill of the transducer art.

The ultrasonic generator 82 is located within the console body on the opposing side of the rinse trough 34. A Genesis Series G-500 generator, made and supplied by Crest Ultrasonics Corp., Scotch Road, Trenton, N.J. 08628, is appropriate for this cleaning application. One model suitably employed has an output of 400 watts (±5%) at 40 kHz, with 115-130 volt input.

The Genesis model is electronically associated (internally of the console) with a first longitudinal end of the Vibrabar Transducer (see Product Bulletin N.310). It is suitably connected to the inside of a horizontal niche 64, so that the insulated leads can pass through the end of the niche into the Vibrabar unit for electrical activation of the power horns, which are arrayed on the obverse side of the Vibrabar external face plate 53.

The Vibrabar transducer module consists of a rectangular radiating "bar," which is permanently attached to the stainless steel radiating surface (face plate 53) by high temperature bonding. Located on the "bar" are two or more piezoelectric stacks. Each piezoelectric stack consists of a PZT disc bolted between the radiating "bar" and a metal backing plate. One surface of the PZT disc is electrically insulated by means of an insulated disc. The Crest Electronics instruction manual IM-3310 provides those skilled in this art with design data and parameters for erecting the radiating transducer 58 employed in the present invention.

Figure 5:
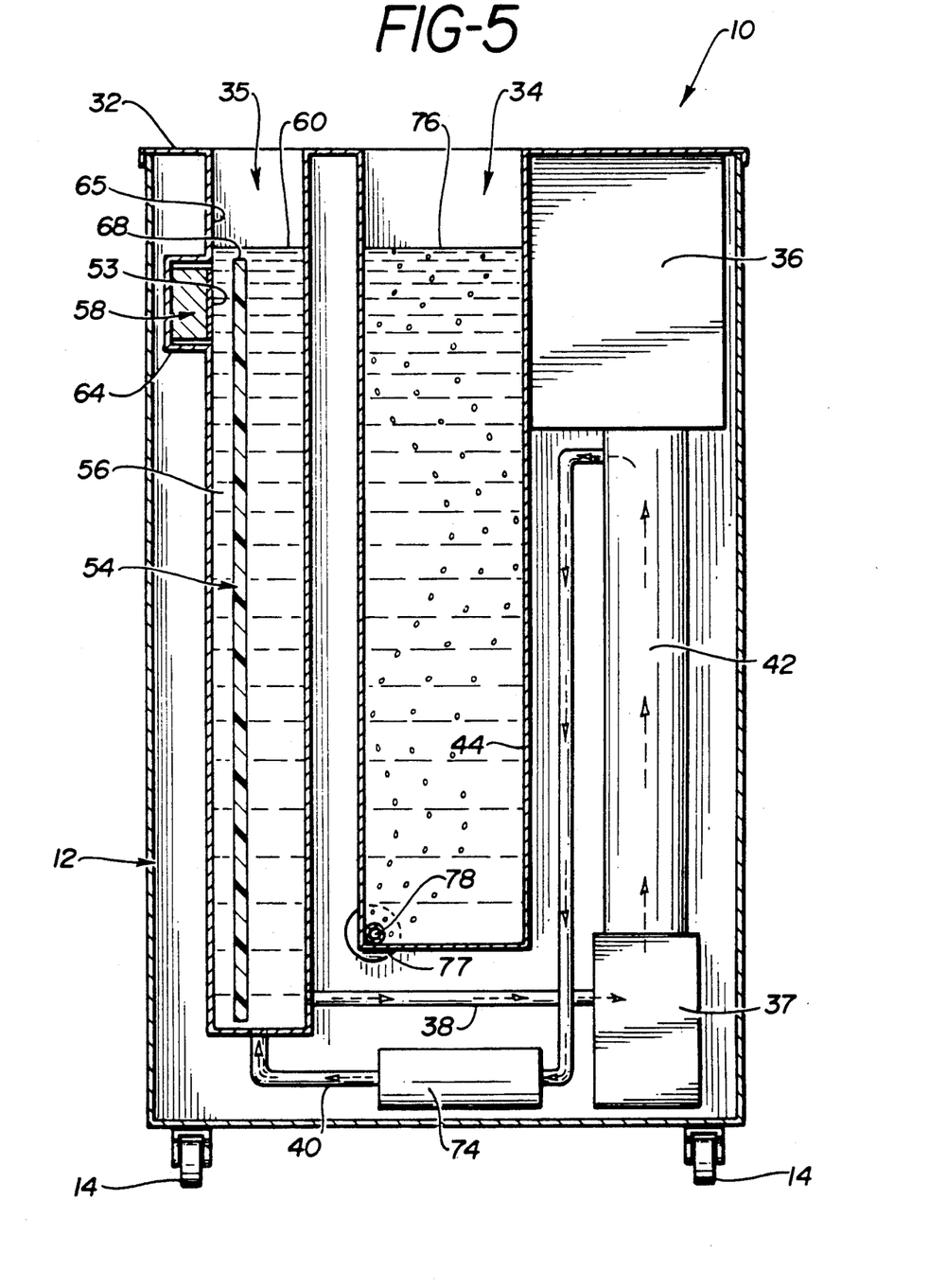
FIG. 5 is a vertical section view (along line 5—5 of FIG. 3) of the system, broken out, to show the internal configuration and the juxtapositions of the operating components, including that of the ultrasonic energy modules relative to a now fully submerged workpiece.

The vertical section view of FIG. 5 depicts the major operating components. Firstly, wash trough 35 contains an immersed, soiled diffuser lens 54, seen momentarily at rest in the circulating wash fluid 56. The transverse dimension of such a diffuser lens is almost 24 in., (vertical in the trough) while this trough is 4 in. wide. Integral wall niche 64 is recessed back about 4 in. from the left hand sidewall 65 and is 4.5 in. high. As described below, the hermetically sealed transducer module 58 is bolted at each of its longitudinal ends into the niche and is selectively activated from the front end control panel shown in FIG. 6, as will be described.

The top level 60 of wash liquid 56 is normally two or more inches above the top edge of face plate 53, while the top edge 68 of resting diffuser lens 54 is seen as disposed at the midpoint of the transducer body. As diffuser lens 54 is moved in, and then out, of the wash trough 34, its entire surface is exposed to the resonant energy of the transducer 58 for a period of at least about 20 seconds.

At the lower end of wash trough 35 are an operably-attached inlet conduit 40 and an outlet conduit 38, which provide for circulation of the wash solution in use. This is controlled by a circulating pump 37 (rated at 3.6 gal./min.). An optional resistance heating module 74 would be disposed adjacent to solution inlet conduit 70, if such a feature is included; generally though, hot tap water will suffice for both wash and rinse troughs.

The dimensions of wash trough are 4 in. across by 28 in. deep, by 50 in. length. This volume will encompass virtually all commercially-sized light diffuser lenses, including lenses, "egg crates," and parabolic reflectors. It is evident that the transducer support niche 64 is integral with the sidewall 75 of wash trough 35 and is filled with wash solution during cleaning operations.

Adjacent but offset about 2 in. from trough 62, is a parallel and independent vertical trough 34, for rinsing the diffuser lenses that have been "scrubbed" in the wash trough 35, which is 7 in. wide, 26 in. deep, and has the same 50 in. length. The small difference in depth from the wash trough 35 still permits full immersion of any diffuser lenses, such as that seen in wash trough 35. The top level 76 of rinse solution in rinse trough 34 is within three inches of the console top surface 32. In the lowest portion of this tank is the longitudinally-aligned, air bubbler (or sparger) conduit 78. The rinse solution in trough 34 is not force-circulated, but is changed frequently, customarily by tub-filling methods (though this can be automated as in a home clothes washer), so as to replenish the concentration of the additive for diffuser lens coating by such liquid.

Adjacent to the upper sidewall of the rinse trough 34 is secured a Genesis Model G-500 Generator 82, which is operably connected through wiring circuits (not shown) to selectively activate the transducer 58. Suspended below generator 36 is the barrel-type filter 42 (schematically shown in FIG. 2), operably connected to circulating pump 37, for removing debris and soil particles from the wash solution, which is circulating through the wash trough 35. All of the just-described components are located within console 10, which is a self-contained cleaning apparatus, made mobile by the inclusion of caster wheels 14.

Optionally, a sealed electrical resistance heater 74 is provided in series fluid communication with piping 40 for heating the wash liquid to an operating temperature of 110° F. to 130° F. Operating in this temperature range will facilitate the scrubbing action by the liquid on the workpiece. The heater 74 is typically rated at 1500 watts.

The temperature of washing liquid should be high enough to effectuate maximum cleansing in minimum time, while at the same time keeping the thermal shock on the planar elongated objects to be cleaned small enough to prevent them from warping, buckling or delaminating. Most of the time it is sufficient to use hot tap water for this purpose.

Figure 6:
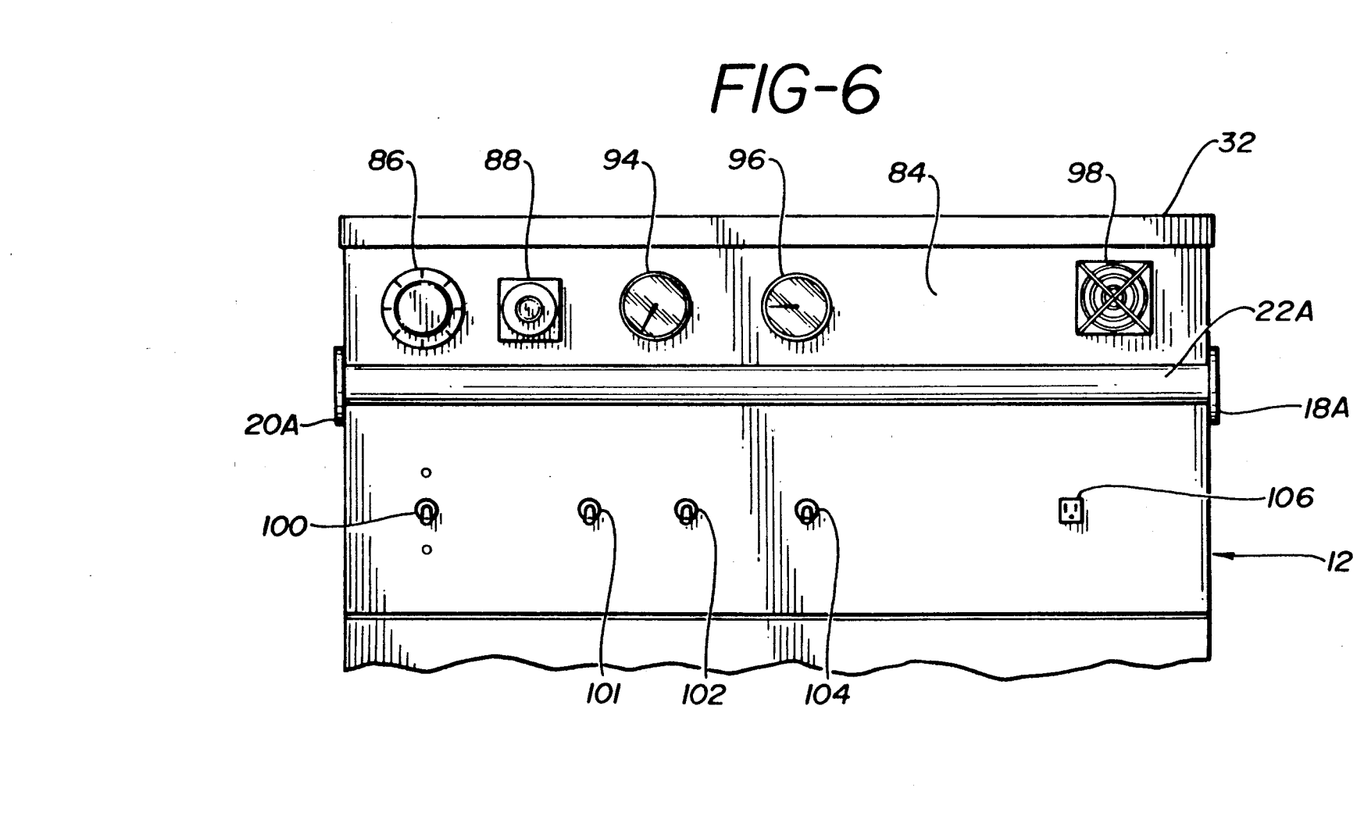
FIG. 6 is a front end elevational view, partly fragmentary, of the meters and control panel of the cleaning console of this invention.

Referring now to FIG. 6, which displays a plurality of the gauges and controls of the console 10, these are disposed on the other end panel 84, just below the upper surface 32 of the console, and are partly shielded by the offset gripping bar 22. Starting with the indexed dial 86 in the upper left corner, this is the rheostat-type control which sets the operating temperature of the inlet conduit resistance heater 74. This is a fully optional aspect for heating the wash solution above hot tap water temperatures or maintaining existing hot water temperatures.

Next on the immediate right is an electronic timer 88, adapted for setting the power cycle, during which the ultrasonic generator/transducer components are activated. An ancillary, override control 100 is seen on left panel 84, adjacent to one lateral side 101 of the front end panel 84. This dual control energizes the ultrasonics for preset cycles, like 20 seconds; but initiation of that span of activation is triggered by the body-operated switch 106. Thus, at will activation and automatic reset of the ultrasonic components are handily effected. Next is the central needle-meter 94 for indicating the wash trough temperature at the skin of that trough.

Next is gauge 96, which is an air pressure readout (range 0 to 5 PSIG), reflecting the feed air pressure to the "bubbler system" 78 of the rinse trough (FIG. 5). The air pump 77 is of the type used in home aquariums, which is adequate for present purposes. The perforated stainless steel air supply conduit 78 is located along the bottom of the rinse trough 34 and provides a continuous effervescent nature to the solution therein.

At the extreme right is provided a so-called "muffin-type" exhaust fan 98, ventilating the upper underspace of the console 10, for exhausting air to maintain the most efficient ambient temperature (below 140° F.) about the ultrasonic generator 36. This fan 98 supplements a small venting fan which is integral within the generator module as sold.

Adverting to the lower control level (below push bar 22), starting at the left, is seen a three-position toggle switch 100, for overall control of the generator/transducer between: a continuous ON-mode power position, an OFF-mode position, and an intermittent ON-mode position. The On mode is actuated by resort to the lateral side receptacle 106. When toggle 100 is ON, in either position the exhaust fan 98 is activated. The auxiliary heater switch 101 is a DPDT switch wired in parallel to switch 104. If switch 104 is not ON, the heater will not energize, so as to eliminate a "burnout." Switch 102 is for activation of the air pump 77. The adjacent switch 104 is for controlling fluid circulation in the wash trough 35 by pump 37, thus passing the debris-loaded liquid through an external line 40 in which there is provided a barrel-type filter 42 (FIG. 2). This serves to extend the period of usefulness of solution in the wash trough 35, before the periodic need for complete dumping of its spent additive and soiled wash liquid 56.

ULTRASONIC TRANSDUCER INSTALLATION

Figure 7:
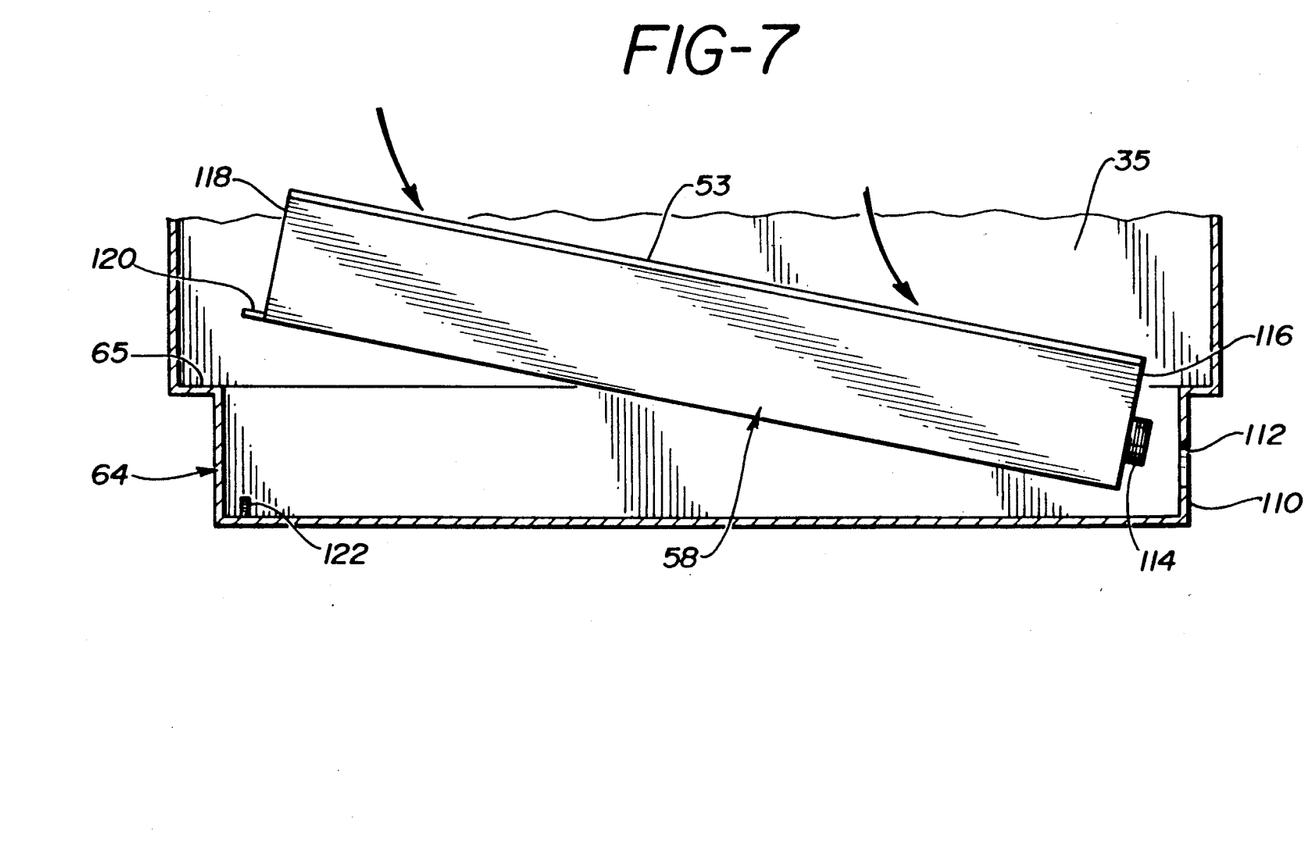
FIG. 7 is a schematic view of a horizontal section depicting the step of mounting the transducer module into the wash tank niche sidewall.
Figure 8:
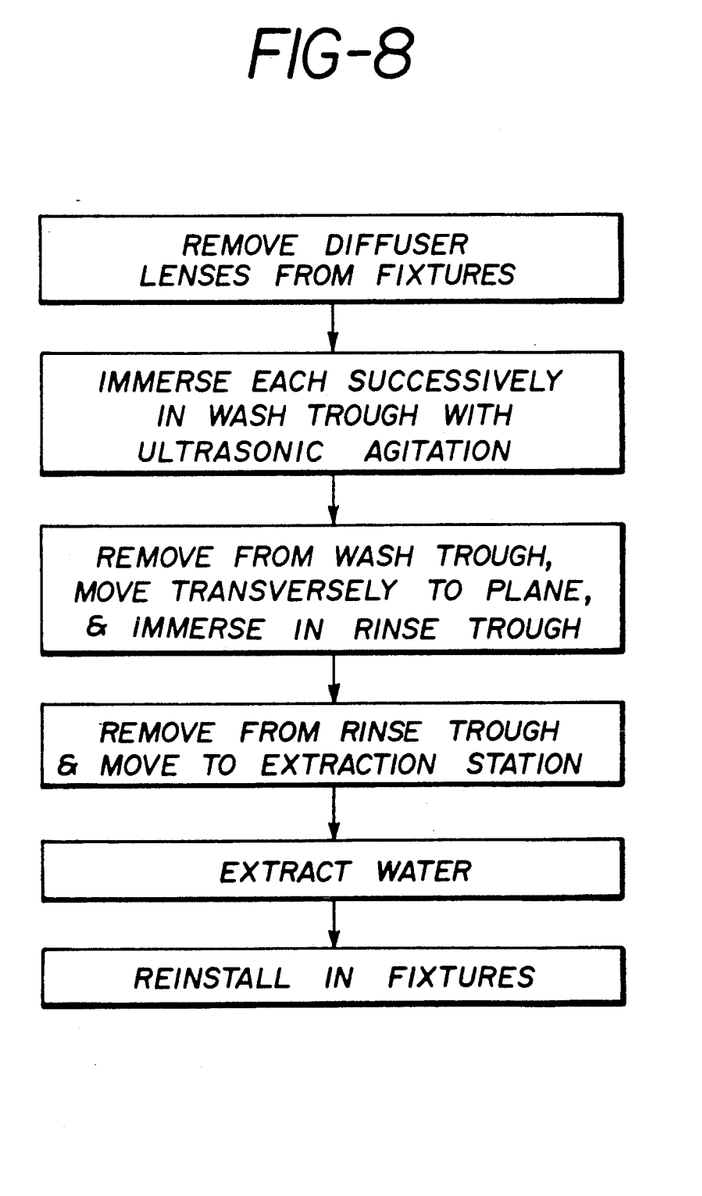
FIG. 8 is a block diagram illustrating steps in the method of the present invention.

In FIG. 7 is a schematic of the means of fixedly mounting transducer module 58 into horizontal niche 64 of wash trough 35. The view is of a horizontal section through the body of the console 10 taken at the level of niche 64. The right end wall 110 of niche 64 is provided with an aperture 112 adapted to admit and support a pipe nipple, through which electrical conduits (not seen) will reach the standard ultrasonic horns (not seen) arrayed within sealed transducer module 58. At the right end (of the elongate transducer) is a threaded projection (pipe nipple) 114, which will slip through aperture 112, anchoring transducer module 58 at its first longitudinal end 116.

On the opposing longitudinal end 118 of transducer 58 is a planar projection, (or slip plate) 120, having therein a central aperture (not seen). Plate 120 is located so as to engage a threaded, bolt-like projection 122, anchored through the inner side wall 124 of the niche. Typically, a ¼×20 in. stainless steel welded stud is useful. During console assembly, or other console down time when the wash trough is empty, the transducer module 58 is aligned horizontally to slip into long niche 64, with module projection 114 making sealing engagement (via sealing gaskets) with the niche end wall 110. The wiring (not seen) that passes from module 58 and nipple 114 through aperture 112 is then connected remotely to the ultrasonic generator 36 (FIG. 5) that is also disposed within the confines of the console.

The left hand flanged end 120 is slipped over stud 122, and a locking head nut (not seen) is turned down tightly, to anchor the transducer module within the niche, which will be in fluid communication with wash liquid upon trough filling.

WASH SOLUTION MAKE-UP

Total wash volume is about 20 gallons. The diluent is usually ordinary hot tap water, which is filled into wash trough 35 of the standing apparatus when on location for cleaning. Up to six (6) ounces of a cleaning agent, desirably an ionic surfactant such as KRC417 Detergent Cleaner, supplied by KRC Research, 315 N. Washington, Morristown, N.J., is added. The option of further heating of the wash solution, by an internally positioned resistance heater, may be employed at this time in the cleaning cycle, by resorting to control dial 86 on end panel 84.

RINSE SOLUTION MAKE-UP

Total volume of rinse solution is about 40 gallons. Diluent is also ordinary hot tap water (no added heating is required), which is filled into rinse trough 34 of the apparatus, more or less concurrently, with differing solution composition from that in the wash trough. About eight (8) ounces of a liquid concentrate, trademarked TWINK, from KRC Research Corp., is desirably dispersed in it. This is a silicone-based fluid, primarily employed for conferring anti-static properties on a cleaned diffuser. The added silicone material is of the formula $Si_nH_{2n+2}$ and sold under the generic name "silane" by Union Carbide Corp. of Danbury, Conn.

Another additive in TWINK confers a germicidal ionic function.

EXAMPLE

The two troughs are loaded up with hot water to their design volumes, and the appropriate liquid concentrates are added and mixed, KRC417 to the wash trough 35, and TWINK concentrate to the larger rinse trough 34. The ultrasonic generator and associated transducers are activated for the preset cycle at end panel 84. A separate diffuser lens (see FIG. 4) is longitudinally aligned relative to the console upper surface 32. It is then manually immersed into the wash tank, thus passing twice before the Vibrabar resonant faceplate 53 (of the transducer-generator components) during a period averaging about 20 seconds. The extent and content of actual soil coating for a specific group of diffuser lenses may require this time period to be varied.

The washed diffuser lens is lifted out, shifted promptly to the wider rinse trough, where it is held immersed in the effervescing liquid up to about two minutes. After removal, it is subject to contact surface dewatering by a commercial, high velocity water suction vacuum device. A useful accessory for this step is the Sears Wet-Dry Vacuum, having a 3 in. conduit diameter and employing a floor cleaning suction nozzle.

The diffuser lens may sit in this rinse trough until the preceding diffuser lens cleaned has been dewatered by the associate operator and be passed on to the reinstallation step. The resting diffuser lens is then lifted for its turn at dewatering. Thus resting time in the rinse trough is not critical and is quite variable.

The cleaned, silicone-coated, and water-free diffuser lens is now ready to be restored to the ceiling fixture.

Preferably the operator removes a group of lenses from contiguous lighting fixtures, e.g. the ones on a particular floor of an office building and places them ready for cleaning in a group, so that when one diffuser lens is removed from the wash trough, the next soiled diffuser lens undergoes the just-described cleaning cycle.

As the removed soil material accumulates in the wash trough, despite the efforts of the circulating pump and filter system of FIG. 5, both troughs may need to be emptied completely, refilled with fresh water and to undergo appropriate concentrate additive make-ups. Empirical observation by the console operator will usually reveal when either liquid is losing cleaning and/or coating power and needs replacement. Experience suggests an average of fifty diffuser lenses can be cleaned before the reservoir needs to be dumped and refilled.

It is estimated that the combined wash-rinse cycle takes only half to one-third of the time of the final dewatering step so the latter is the limiting factor on productivity. For large-scale use, one operator may have the task of placing diffuser lenses into the wash trough and then into the rinse trough, another operator of removing lenses from the rinse trough and placing them ready for drying, and one or more operators of extracting the water by suction.

Regarding optimum physical placement of the soiled diffuser lens while in the wash tank phase., the top edge 68 of the immersed diffuser lens is temporarily, and preferably, aligned along with the bottom edge of the faceplate 53 of the transducer 58. At the minimum, the diffuser lens top edge 68 should descend to the midrange of the transducer radiation bar. To achieve this, the wash liquid is normally filled to 3 in. above the transducer top edge, but perhaps 3 in. below the cover surface, to limit splashing of the reservoir fluid onto the console top during the repetitive diffuser lens immersion and lift-out cycles.

While the invention has been described with a certain degree of particularity, it should be understood that the present disclosure has been made only by way of example and that numerous changes in construction and accommodation rearrangement of parts may be resorted to without departing from the spirit and scope of the present invention.

Having thus described the invention, what it is desired to claim and thereby secure by Letters Patent is:

1. A generally box-like cleaning system with a planar cover means adapted for cleaning a formed planar elongate object, said cleaning system having plural top surface apertures, using a contained liquid medium adapted to ultrasonic transducer agitation without incurring appreciable volatilization, comprising:

(a) a generally box-like cabinet having a top and side walls;

(b) a generally rectangular wash trough having imperforate end walls, side walls and bottom wall adapted to receive and retain a substantial volume of a wash liquid, the wash trough communicating with a generally rectangular aperture in the top of the enclosure and having such dimensions that the planar elongate object to be cleaned may be manually placed therein and fully immersed in said wash liquid;

(c) a generally rectangular rinse trough, substantially parallel to the wash trough, having imperforate side walls, end walls and a bottom wall adapted to receive and retain a substantial volume of a rinse liquid, the rinse trough communicating with a generally rectangular aperture in the top of the enclosure;

(d) a flow inlet means and companion flow outlet means connected to the lower portion of said wash trough adapted for circulating the wash liquid;

(e) an ultrasonic generator adapted to be connected to a source of electrical power and comprising means for conducting an ultrasonic signal to activate a transducer;

(f) a substantially horizontal, box-like niche disposed in one side wall of said wash trough, and vertically located so as to be below the functional surface of the wash liquid while the cleaning system is in the operating mode, which niche is also in communication with the wash trough along one lateral surface;

(g) at least one submersible, ultrasonic transducer fixedly mounted within said niche and adapted to be immersed in said liquid medium for effecting its agitation upon activation by an ultrasonic signal from said ultrasonic generator;

(h) the transverse dimension of the wash trough being such that the immersed planar elongate object being so cleaned may be efficiently subjected to ultrasonic agitation; and (i) the dimensions and placement of the rinse trough being such that the planar article may be manually removed from said wash trough, moved a short distance transversely, and then be substantially fully immersed in the contained rinse liquid.

2. The apparatus of claim 1, wherein the generally rectangular aperture in the -top of the cabinet overlying the wash trough makes peripheral and sealing contact therewith, and wherein the generally rectangular aperture in the top of the cabinet overlying the rinse trough makes peripheral and sealing contact therewith.

3. The apparatus of claim 1 wherein the flow inlet and outlet conduits associated with said wash trough have a physical filter means positioned therein to effect removal of particulate contamination from the circulating liquid.

4. The apparatus of claim 3, further comprising an aqueous wash liquid in said wash trough, the liquid being agitated ultrasonically when said transducer is activated and comprising a surfactant for cleansing a soiled planar elongate object when it is immersed in the wash trough while said transducer is activated.

5. The apparatus of claim 1 wherein said ultrasonic transducer is operatively associated with an ultrasonic generator means that provides at least 400 watts and vibrates in about the 40 kHz range.

6. The apparatus of claim 1, further comprising an aqueous rinsing liquid in said rinse trough, said aqueous rinsing liquid containing coating compounds adapted for deposition on the cleansed planar elongate object.

7. The apparatus of claim 1 wherein the liquid holding volume of the rinse trough is about double that of the liquid holding volume of the wash trough.

8. The apparatus of claim 1 wherein the rinse trough is provided with a bottom-located, perforated conduit means for broadcast of air bubbles into the trough during the rinsing step.

9. The apparatus of claim 1 wherein the ultrasonic generator means is positioned physically adjacent to said rinse trough and within the cabinet.

10. The apparatus of claim 1 wherein the length, depth and width of each of said troughs is sufficient to admit substantially all commercially-employed fluorescent fixture light diffuser lenses.

11. The apparatus of claim 1 wherein the longitudinal dimension of said transducer is at least equivalent to the longitudinal dimension of an immersed light diffuser lens.

12. The apparatus of claim 1, further comprising a set of wheels at the bottom of the cabinet and push bar means at about the top of the cabinet, whereby the apparatus is mobile.

13. The apparatus of claim 1 wherein the electrical circuitry is protected by ground fault circuit interrupters.

14. A method of cleansing a topically-soiled, generally planar light diffuser lens for a fluorescent tube lighting fixture using the apparatus of claim 1 comprising:
(a) removing a soiled diffuser lens from a lighting fixture,
(b) inserting the soiled diffuser lens vertically into a first deep trough containing an aqueous washing liquid and effecting a dual pass across an ultrasonic transducer disposed longitudinally of the trough to effect a substantial displacement of surface soil into the wash liquid;
(c) moving the substantially cleansed diffuser lens to a second deep trough containing an aqueous rinsing liquid adapted to deposit a material on the diffuser lens so as to provide it with desired physical properties;
(d) moving the cleansed, rinsed and topically coated article to another station adapted to effect substantially full removal of the aqueous rinsing liquid retained on the lens surfaces; and
(e) restoring the thoroughly cleansed and coated lens to the ceiling fixture to which it is adapted.

15. The method of claim 14 in which the washing liquid contains a surfactant-type additive.

16. The method of claim 14 in which the rinsing liquid contains a silicone-based additive adapted to deposit and provide an antistatic coating on the lens surfaces.

17. The method of claim 14 in which the washing liquid in the first trough means is circulated during the cleansing step.

18. The method of claim 17 in which the circulating washing liquid is concurrently passed through an external filtration means to remove debris and soil particles dispersed in said washing liquid.

19. The method of claim 14 in which the rinsing liquid in the second trough is aerated during the rinsing step.

20. The method of claim 14 in which the movement of the substantially cleaned diffuser lens from the washing trough to the rinsing trough is substantially transverse to the plane of the diffuser lens, thereby effecting speed and minimizing warping forces thereon.

21. The method of claim 14 further comprising the steps of:
(i) moving mobile cleaning aparatus comprising first and second deep troughs and means for removing liquid from a rinsed diffuser lens to a location in a building where a multiplicity of soiled diffuser lenses may be readily assembled for cleaning,
(ii) removing a multiplicity of soiled diffuser lenses in accordance with said step (a) from generally contiguous lighting fixtures on a particular floor of a building and moving them to said location of the mobile cleaning apparatus,
(iii) using said mobile cleaning apparatus to perform said steps (b), (c), and (d) sequentially, such that soon after a first of said diffuser lenses is removed from said first deep trough and placed in said second deep trough, a second of said diffuser lenses is placed into said first deep trough, whereby it is subjected to ultrasonic cleaning; and
(iv) performing said step (e) for each of said diffuser lenses.

22. The method of claim 14, wherein the cleaning liquid and rinsing liquid are each at a temperature from about 110° F. to about 130° F.

23. The method of claim 21, wherein said mobile cleansing apparatus recited in step (i) further comprising means for removing liquid from a diffuser lens by vacuum suctioning.

* * * * *